US012697857B1

(12) United States Patent
Benner

(10) Patent No.: US 12,697,857 B1
(45) Date of Patent: Aug. 4, 2026

(54) AUTOMATIC WINDSHIELD SHADE DEVICE

(71) Applicant: Jacob Benner, Pekin, IL (US)

(72) Inventor: Jacob Benner, Pekin, IL (US)

( * ) Notice: Subject to any disclaimer, the term of this patent is extended or adjusted under 35 U.S.C. 154(b) by 352 days.

(21) Appl. No.: 18/528,080

(22) Filed: Dec. 4, 2023

Related U.S. Application Data

(60) Provisional application No. 63/429,593, filed on Dec. 2, 2022.

(51) Int. Cl.
B60J 3/02 (2006.01)

(52) U.S. Cl.
CPC .................................. B60J 3/0234 (2013.01)

(58) Field of Classification Search
CPC ....................................................... B60J 3/0234
USPC ........................................................ 296/97.4
See application file for complete search history.

(56) References Cited

U.S. PATENT DOCUMENTS

| | | | |
|---|---|---|---|
| 4,491,360 A * | 1/1985 | Fleming | ................. B60J 3/0204 |
| | | | 296/97.4 |
| 4,775,180 A | 10/1988 | Phillips | |
| 5,551,744 A | 9/1996 | Liao | |
| 5,751,488 A | 5/1998 | Wade | |
| 5,947,544 A | 9/1999 | Hubeshi | |
| 6,227,601 B1 * | 5/2001 | LaFrance | ............... B60J 1/2011 |
| | | | 296/97.4 |
| 6,572,173 B2 * | 6/2003 | Muller | ...................... F21L 2/00 |
| | | | 296/97.2 |
| 7,149,663 B1 | 12/2006 | Barrett | |
| 8,162,376 B1 * | 4/2012 | Grossmith | ............. B60J 3/0243 |
| | | | 296/97.4 |
| 9,340,095 B2 * | 5/2016 | Sinclair | .................. B60J 1/2044 |
| 10,081,227 B1 * | 9/2018 | Mao | ........................ B60J 1/2041 |
| 11,454,814 B2 * | 9/2022 | Rittger | ............... G02B 27/0149 |
| 12,134,306 B2 * | 11/2024 | Wilder | ...................... B60J 1/002 |
| 2002/0033244 A1 | 3/2002 | Schlecht et al. | |
| 2020/0290437 A1 * | 9/2020 | Manatpon | .............. B60J 7/0015 |
| 2024/0351407 A1 * | 10/2024 | Hardy | .................... B60J 1/2019 |

* cited by examiner

*Primary Examiner* — Aaron L Lembo
(74) *Attorney, Agent, or Firm* — Cramer Patent & Design, PLLC.; Aaron R. Cramer

(57) ABSTRACT

The Automatic Internal Windshield Cover is a device designed for motor vehicles to provide protection and shading from the sun's rays. This device operates similarly to a household pull-down window shade but uniquely mounts at the vehicle's windshield base, extending upwards. It incorporates a network of recessed tracks and magnets along the windshield sides, facilitating smooth operation. The system is powered by a deployment motor and a retraction motor, which work collaboratively to unfold and retract the cover across the windshield. A motor control circuit is designed to automatically extend the shades when the vehicle is off and retract them upon ignition. Additionally, a central switch is integrated for manual operation and override functions, while an interlock circuit prevents deployment when the vehicle is in operation. This device is envisioned to be available both as optional equipment for new vehicles and as a retrofit kit for existing vehicles.

2 Claims, 3 Drawing Sheets

AUTOMATIC WINDSHIELD SHADE DEVICE

RELATED APPLICATIONS

The present device was first described in and is a continuation of U.S. Provisional Application No. 63/429,593, filed Dec. 2, 2022, the entire disclosures of which are incorporated herein by reference.

FIELD OF THE DEVICE

The field of the described device pertains to automotive accessories, specifically an automatic internal windshield shade device designed to protect the interior of motor vehicles from sunlight and heat by automatically deploying and retracting a shade over the windshield.

BACKGROUND OF THE DEVICE

The excessive exposure of a vehicle's interior to sunlight can lead to several problems, such as elevated internal temperatures, fading of upholstery, and degradation of dashboard materials. Traditional methods to prevent these issues involve the use of manually placed shades or tinted windows. However, these solutions have their drawbacks. Manual shades require the driver or passenger to physically set up and remove them, a process that can be cumbersome and easily forgotten. Tinted windows, on the other hand, provide a permanent reduction in visibility and may not be legal in all jurisdictions.

Existing automated systems have attempted to address these concerns but often fall short in practicality and efficiency. Many such systems are complex, expensive, and may not fully cover the windshield, leaving areas exposed to sunlight. Additionally, they may not be adaptable to a wide range of vehicle models and sizes, limiting their applicability.

Therefore, a need exists for an improved automatic windshield shade device that is simple, efficient, and adaptable to various vehicle types. Such a device should be capable of automatically deploying and retracting in response to the operational state of the vehicle, thereby providing convenience and effectiveness in protecting the vehicle's interior from sun damage. The current device seeks to fulfill this need and provides further related advantages in a manner that is efficient and cost effective.

SUMMARY OF THE DEVICE

The present disclosure encompasses various embodiments of an automatic windshield shade device designed for motor vehicles. This device includes a shade that extends across the windshield, moving along designated deployment and retraction paths. The movement of the shade is facilitated by a deployment motor and a retraction motor, guided by a control circuit that responds to the operational state of the motor vehicle. The device also incorporates an upper travel limit switch and a lower travel limit switch to regulate the shade's movement, along with a set of magnets to secure the shade in its deployed position.

Additionally, the device features a roller for neatly storing the shade when retracted. A manual control switch is available, allowing the user to override the automatic functions. The shade, typically made of a flexible material with a ferromagnetic upper edge, is designed to automatically deploy when the motor vehicle is turned off and retract when turned on.

The shade operates within a pair of slide tracks, positioned along the roof pillars of the motor vehicle, to ensure a smooth transition along the deployment and retraction paths. For storage purposes, a dash cavity houses the roller and part of the shade when not in use. The manual control switch is equipped with upward and downward directional indicia to facilitate user control over the shade's movement. Power to the control circuit is supplied through an ignition positive connection and a battery positive connection, dependent on the ignition state of the motor vehicle.

The disclosure also outlines a method for controlling the automatic windshield shade device, which includes deploying and retracting the shade in accordance with the vehicle's ignition state, using magnets for retaining the shade in its deployed state, and providing manual override options. This method ensures that the shade's deployment and retraction are efficiently controlled by the deployment and retraction motors under the guidance of the control circuit.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
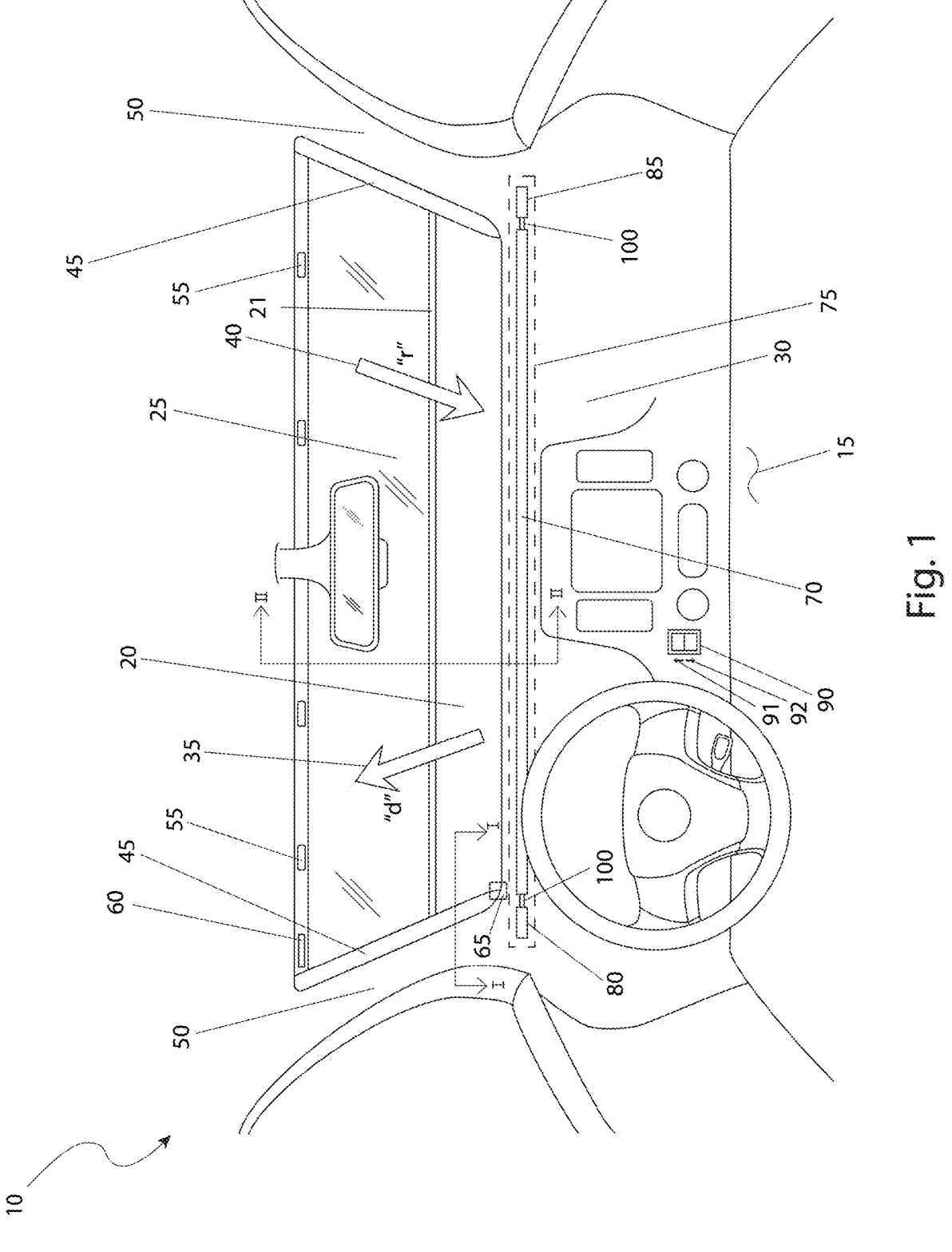
FIG. 1 is an interior view of the automatic windshield shade device 10, shown in an installed state on a motor vehicle 15, according to the preferred embodiment of the present device.

DESCRIPTIVE KEY 10 automatic windshield shade device
15 motor vehicle
20 shade
21 shade upper edge
25 windshield
30 dash
35 deployment travel path "d"
40 retraction travel path "r"
45 slide track
47 gap
50 roof pillar
55 magnet
60 upper travel limit switch
65 lower travel limit switch
70 roller
75 dash cavity
80 retraction motor
85 deployment motor
90 switch
91 upward directional indicia
92 downward directional indicia
95 windshield mounting means
100 battery positive connection 105 control circuit
110 ignition positive connection
115 ground connection

1. Description of the Device

The best mode for carrying out the device is presented in terms of its preferred embodiment, herein depicted within FIGS. 1 through 4. However, the device is not limited to the described embodiment, and a person skilled in the art will appreciate that many other embodiments of the device are possible without deviating from the basic concept of the device and that any such work around will also fall under scope of this device. It is envisioned that other styles and configurations of the present device can be easily incorporated into the teachings of the present device, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIG. 1, an interior view of the automatic windshield shade device 10, shown in an installed state on a motor vehicle 15, according to the preferred embodiment of the present device is disclosed. The automatic windshield shade device (herein also described as the "device") 10, is installed in such a manner as to be selectively automatically or manually extendable and retractable. The motor vehicle 15 in FIG. 1 is depicted as a common automobile, however it is noted that the teachings of the present device can be applied to all types of motor vehicles 15, including trucks, busses, recreational vehicles, vans, SUV's and the like. As such, the application of the device 10 on any particular vehicle shall not be a limiting factor of the present device.

A shade 20 is shown in a partially deployed state across the windshield 25. The configuration of the shade 20 is intended to be illustrative as would be expected during the operation of the device 10. The shade 20 is preferably rectangular sheet of limited flexibility, having a lower end and an upper end. Coextensive with the upper end of the shade 20 is a shade upper edge 21, which may be a ferromagnetic or partially ferromagnetic rigid linear element. The shade 20 extends upward from the bottom of the windshield 25 near the dash 30 with the shade upper edge 21 edge positioned at the upper edge of the windshield 25 when fully deployed. The shade 20 operates along a deployment travel path "d" 35 when travelling upward, and along a retraction travel path "r" 40 when travelling downward. The shade 20 is positioned at the bottom of its travel path while the motor vehicle 15 is operational and will be positioned at its upward travel path when parked. The sides of the windshield 25 are retained in a pair of slide tracks 45 located along the roof pillars 50. Further detail on the configuration of the slide track 45 and the roof pillars 50 will be provided herein below. When it is in a fully deployed position, the shade upper edge 21 is aided in retainment of its position by multiple magnets 55. The magnets 55 are of a limited strength such that they disengage when the shade 20 begins its downward retraction travel path "r" 40. An upper travel limit switch 60 and a lower travel limit switch 65 are provided for use by a control circuit. When in a retracted state, the shade 20 is arranged in a rolled format on a roller 70 within a dash cavity 75. The dash cavity 75 is shown via dashed lines due to its concealed nature. A retraction motor 80 is located on the left side of the roller 70, while a deployment motor 85 is located on the right side. Finally, a manual switch 90 is located on the dash for manual control of the device 10 as will be described in greater detail herein below.

Figure 2:
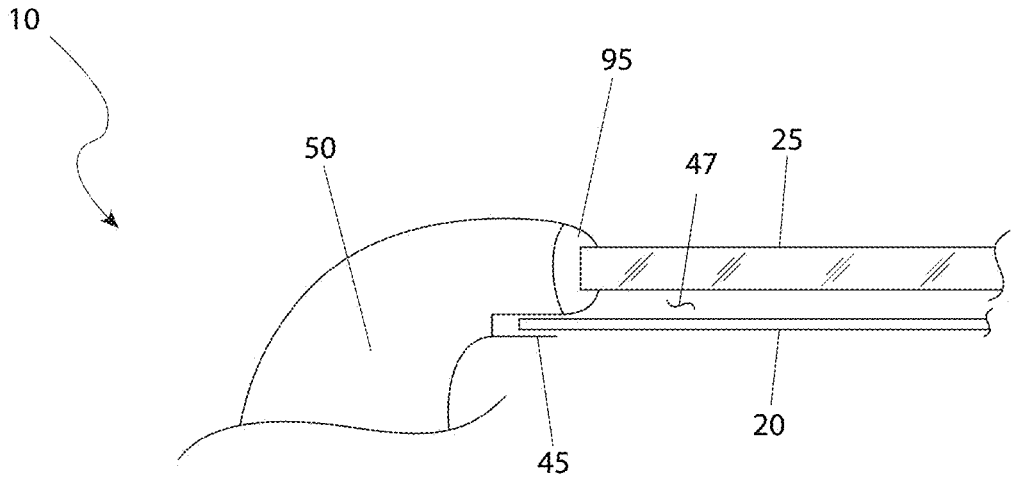
FIG. 2 is a sectional view of the automatic windshield shade device 10, as seen along a line I-I, as shown in FIG. 1, according to the preferred embodiment of the present device.

Referring next to FIG. 2, a sectional view of the device 10, as seen along a line I-I, as shown in FIG. 1, according to the preferred embodiment of the present device is depicted. The windshield 25 is attached to the slide tracks 45 via a windshield mounting means 95 such as a gasket, molding, adhesive, and/or the like in a typical and expected manner. In a similar manner, the shade 20 is contained in the slide tracks 45, albeit in a moving and sliding manner, within a gap 47 defined as between the inner side of an individual slide track 45 and the windshield 25. Both the windshield mounting means 95 and the slide tracks 45 are attached to the roof pillars 50. It is noted that the configuration of the roof pillars 50 as shown will vary per each make and model of motor vehicle 15 (as shown in FIG. 1) but is intended to be illustrative in nature.

Figure 3:
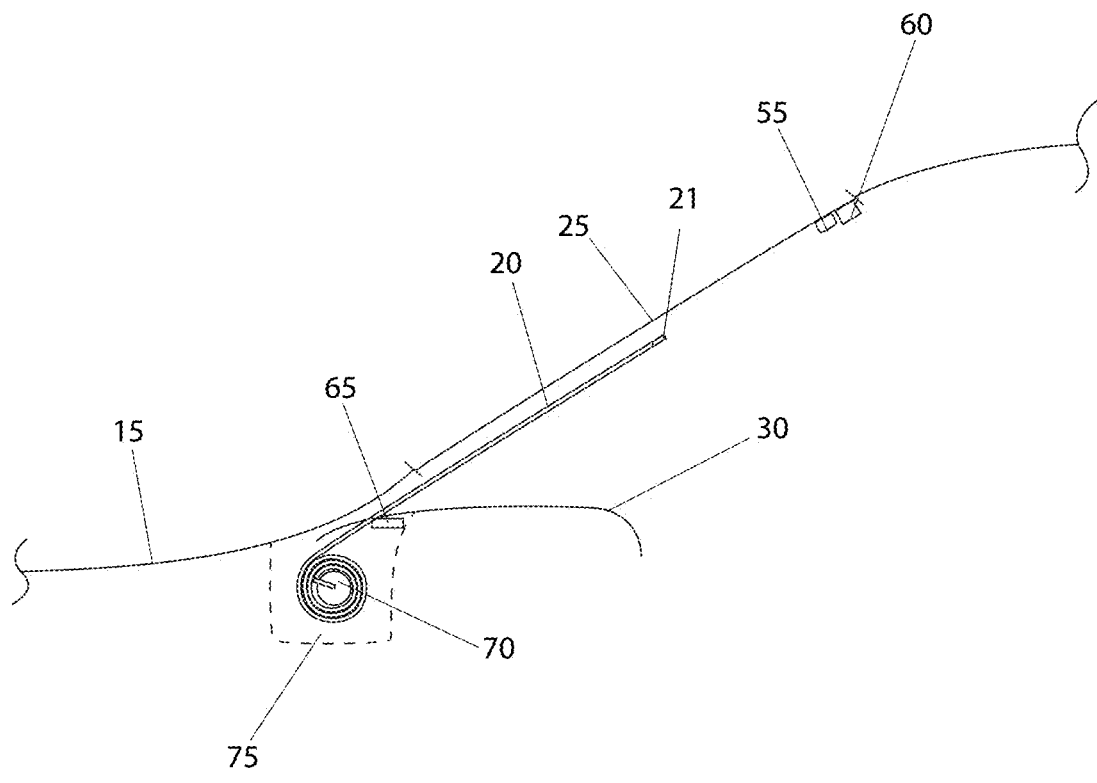
FIG. 3 is a sectional view of the automatic windshield shade device 10, as seen along a line II-II, as shown in FIG. 1, according to the preferred embodiment of the present device; and, FIG. 4 is an electrical block diagram of the automatic windshield shade device 10, according to the preferred embodiment of the present device.

Referring now to FIG. 3, a sectional view of the device 10, as seen along a line II-II, as shown in FIG. 1, according to the preferred embodiment of the present device is shown. The shade 20 is routed within the gap 47 of the slide tracks 45 parallel to the windshield 25 as shown within the body of the motor vehicle 15. The magnets 55 and the upper travel limit switch 60 are visible at the upper side of the windshield 25 at the end of the travel of the deployment travel path "d" 35 (as shown in FIG. 1). The upper travel limit switch 60 may be located along either slide track 45. Likewise, the lower travel limit switch 65 is visible at the lower side of the windshield 25 at the end of the travel of the retraction travel path "r" 40 (as shown in FIG. 1), located at the bottom of either slide track 45. The shade 20 continues into the dash cavity 75 at the far end of the dash 30 and is coiled around the roller 70. This is accomplish by having the shade lower edge attached thereto.

Figure 4:
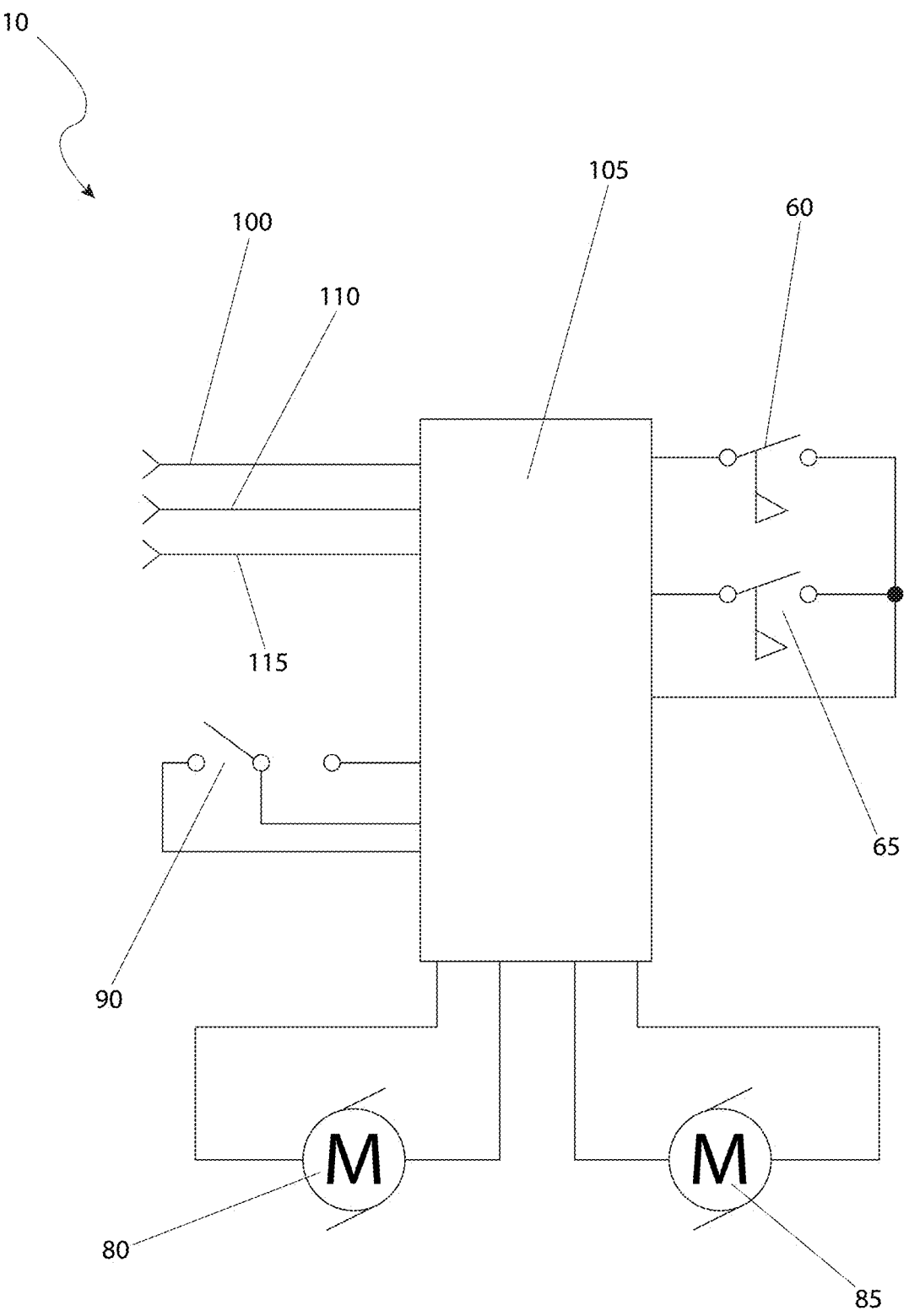

Referring to FIG. 4, an electrical block diagram of the device 10, according to the preferred embodiment of the present device is disclosed. An ignition positive connection 110 provides power that is always available into a control circuit 105. An ignition positive connection 110 provides power only when the ignition is on into the control circuit 105. A ground connection 115 provides a return connection for the battery positive connection 100 and the ignition positive connection 110. The control circuit 105 also receives inputs from the upper travel limit switch 60, the lower travel limit switch 65 and the switch 90. The switch 90 allows for manual control of the device 10 only when the ignition positive connection 110 is not present. An upward directional indicia 91 and a downward directional indicia 92 are located adjacent to thew switch 90 to indicate which position the switch 90 needs to be activated in order to selectively provide either the deployment travel path "d" 35 or the retraction travel path "r" 40, respectively. Output power from the control circuit 105 is provided to the retraction motor 80 and the deployment motor 85. Under normal operating conditions, whenever the ignition positive connection 110 is on or active, the shade 20 is fully retracted or in a state of being retracted by the retraction motor 80. Whenever the ignition positive connection 110 is off, the shade 20 is fully deployed, or in a state of being deployed by the deployment motor 85. Additionally, when the ignition positive connection 110 is off, the device 10 may also be controlled by the manual up/down switch 90. Operation of the device 10 when the ignition positive connection 110 is on would be forbidden by the control circuit 105 for safety reasons.

3. Operation of the Preferred Embodiment

The preferred embodiment of the present device can be utilized by the common user in a simple and effortless manner with little or no training. It is envisioned that the device 10 would be constructed in general accordance with FIG. 1 through FIG. 4. As the application and installation of the present device requires a considerable amount of changes to the vehicle to keep the outward appearance of the device discrete, it is envisioned that a user would procure the device 10 as part of standard or optional equipment on new motor vehicles as sold by automobile dealerships. The device may also be procured during the sale of a used motor vehicle with the present device already installed.

During utilization of the device 10, the following procedure would be initiated: when the user enters the motor vehicle 15 and activates the ignition circuit, the ignition positive connection 110 will energize the control circuit 105 and power the retraction motor 80 which drives the shade 20 along the retraction travel path "r" 40 until the lower travel limit switch 65 is activated; when the ignition switch is deactivated, the lack of the ignition positive connection 110 will cause the control circuit 105, using power from the battery positive connection 100, to drive the deployment motor 85 along number the deployment travel path "d" 35 until the upper travel limit switch 60 is activated. Should the user wish to control the shade 20 when the motor vehicle 15 is turned off, the switch 90 may be utilized to drive the retraction motor 80 and the deployment motor 85 in a manner similar to that described above. Such operation continues in a repeating manner during all cycles of vehicle operation. When it is desired to retain the shade 20 in a fully deployed state, the shade upper edge 21 is placed over the magnets 55.

The operational scenario provides the following benefits: a hands-free operation, an automatic operation, a convenience to driver and vehicle occupants, a transparent operation to users not familiar to the present of the device 10, it is easy-to-use, it is a time-saver, it can be an additional feature on future luxury motor vehicle 15, it is visually appealing appearance, it has a simplicity and convenience that it will bring to the user's life, and it possesses the ability to deploy/retract the shade 20 when the motor vehicle 15 is not in use.

The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. An automatic windshield shade device for a motor vehicle, comprising:

a shade configured to extend across a windshield of the motor vehicle, the shade being made of a flexible material and including a ferromagnetic upper edge;

a pair of slide tracks located along a plurality of roof pillars of the motor vehicle, the pair of slide tracks configured to guide the shade along a deployment travel path and a retraction travel path, wherein each of the slide tracks defines a gap between the slide track and the windshield within which the shade travels;

a roller housed within a dash cavity of the motor vehicle, the roller configured to store the shade in a retracted position;

a set of magnets configured to retain the ferromagnetic upper edge of the shade in a fully deployed position, the set of magnets having a retention force dimensioned to passively disengage from the ferromagnetic upper edge upon commencement of retraction of the shade;

a deployment motor and a separate retraction motor each operably connected to the shade, the deployment motor dedicated to moving the shade along the deployment travel path and the retraction motor dedicated to moving the shade along the retraction travel path;

an upper travel limit switch positioned at an upper end of the deployment travel path and a lower travel limit switch positioned at a lower end of the retraction travel path, the upper travel limit switch configured to halt the deployment motor when the shade reaches the fully deployed position and the lower travel limit switch configured to halt the retraction motor when the shade reaches a fully retracted position;

a control circuit configured to:

receive a battery positive connection that provides power independent of a vehicle ignition state;

receive an ignition positive connection that provides power only when the vehicle ignition is active;

automatically activate the retraction motor to move the shade along the retraction travel path when the ignition positive connection is active;

automatically activate the deployment motor to move the shade along the deployment travel path using power from the battery positive connection when the ignition positive connection is inactive; and prevent any deployment of the shade when the vehicle ignition is active; and, a manual control switch located on a dash of the motor vehicle, the manual control switch including an upward directional indicia and a downward directional indicia, the manual control switch configured to selectively control the deployment motor and the retraction motor only when the ignition positive connection is inactive.

2. A method for operating an automatic windshield shade device in a motor vehicle, the method comprising:

guiding a shade made of a flexible material with a ferromagnetic upper edge along a deployment travel path and a retraction travel path using a pair of slide tracks located along a plurality of roof pillars of the motor vehicle, wherein each slide track defines a gap between the slide track and a windshield of the motor vehicle within which the shade travels;

storing the shade in a retracted position on a roller housed within a dash cavity of the motor vehicle;

automatically activating, by a control circuit receiving power from a battery positive connection, a deployment motor dedicated to moving the shade along the deployment travel path across the windshield in response to a vehicle ignition being turned off, the deployment motor being a separate and distinct motor from a retraction motor dedicated to moving the shade along the retraction travel path;

halting deployment of the shade upon activation of an upper travel limit switch positioned at an upper end of the deployment travel path when the shade reaches a fully deployed position;

passively retaining the ferromagnetic upper edge of the shade in the fully deployed position using a set of magnets, the set of magnets having a retention force dimensioned to disengage from the ferromagnetic upper edge upon commencement of retraction;

automatically activating, by the control circuit receiving power from an ignition positive connection, the retraction motor to move the shade along the retraction travel path in response to the vehicle ignition being turned on;

halting retraction of the shade upon activation of a lower travel limit switch positioned at a lower end of the retraction travel path when the shade reaches a fully retracted position;

preventing, by the control circuit, any deployment of the shade when the vehicle ignition is active; and, selectively controlling the deployment motor and the retraction motor via a manual control switch located on a dash of the motor vehicle, the manual control switch including an upward directional indicia and a downward directional indicia, wherein the manual control switch is operable only when the vehicle ignition is inactive.

\* \* \* \* \*